United States Patent [19]

Kumagai et al.

[11] Patent Number: 5,175,593
[45] Date of Patent: Dec. 29, 1992

[54] FINGERPRINT PHOTOGRAPHING SYSTEM

[75] Inventors: Ryohei Kumagai, Tokyo; Kazuo Maruta, Osaka, both of Japan

[73] Assignees: Ezel, Inc., Tokyo; Sharp Corporation, Osaka, both of Japan

[21] Appl. No.: 735,608

[22] Filed: Jul. 26, 1991

[30] Foreign Application Priority Data

Jul. 27, 1990 [JP] Japan .................................. 2-199866
Apr. 1, 1991 [JP] Japan .................................. 3-094698

[51] Int. Cl.[5] .............................................. G06K 9/20
[52] U.S. Cl. ...................................................... 356/71
[58] Field of Search .................................. 356/71, 237

[56] References Cited

U.S. PATENT DOCUMENTS 4,832,485  5/1989  Bowles ..................... 356/71
5,074,661  12/1991 Reynolds et al. ........... 356/237

FOREIGN PATENT DOCUMENTS 61100     1/1986  Japan .
61101     1/1986  Japan .
61-28171  2/1986  Japan .
61-145686 7/1986  Japan .
62-266686 11/1987 Japan .

OTHER PUBLICATIONS

Matsuura et al., "A Method for Fingerprint Image Enhancement Using the Ridge Direction", The Transactions of the Institute of Electronics, Information and Communication Engineers, vol. J72-D-II, No. 2, pp. 302-306. Feb. 1989.

Sasakawa et al., "Personal Verification System with High Tolerance of Poor Quality Fingerprints", The Transactions of the Institute of Electronics, Information and Communication Engineers, vol. J72-D-II, No. 5, pp. 707-714, May 1989.

Hoshino et al., "Automated Fingerprint Identification by Minutianetwork Feature-Matching Processes-", The Transactions . . . of Electronics, Infor. & Communication Engineers, vol. J72-D-II, No. 5, pp. 733-740, May 1989.

Asai et al., "Automated Fingerprint Identification by Minutia-Network Extraction Process", The Transactions . . . Electronics, Information . . . Engineers, vol. J72-D-II, No. 5, pp. 724-732, May 1989.

"Algorithm of Fingerprint Verification System", Nikkei Electronics, Jan. 1989 (No. 464).

*Primary Examiner*—Vincent P. McGraw
*Attorney, Agent, or Firm*—Cushman, Darby & Cushman

[57] ABSTRACT

A fingerprint photographing system comprising: a prism having a detection surface where a finger is pressed thereon; a luminous source for irradiating light to the detection surface; a camera for detecting the light reflected upon the detection surface; and means for comparing the image before and after the finger is pressed upon the detection surface and for storing the image of fingerprint to a memory when the number of pixels of the image with a predetermined density difference is in the range of predetermined number.

5 Claims, 2 Drawing Sheets

# FINGERPRINT PHOTOGRAPHING SYSTEM

FIELD OF THE INVENTION

The present invention relates to a fingerprint photographing system provided for, for example, a fingerprint verification system.

BACKGROUND OF THE INVENTION

Conventionally, a system to photograph a fingerprint of a finger pressed onto the surface of a prism with a video camera disposed under the surface of the prism is well-known in the art. Photographed image data of the fingerprint is inputted to a computer to be compared with fingerprints (master data) stored in a memory. Here, it is preferable that the image data of fingerprint is as clear as possible. However, the data may not be clear enough due to the given pressure of a finger to the prism or perspiration on the surface of the finger. Therefore, it is necessary to properly select the data provided for the verification to the computer.

The present invention solves the above problems of the prior art and has an object to provide a fingerprint photographing system which obtains an image data of a clear fingerprint for fingerprint verification.

SUMMARY OF THE INVENTION

A fingerprint photographing system according to the present invention comprises: a prism having a detection surface where a finger is to be contacted; a luminous source for irradiating light from the finger surface side to the detection surface; a luminous source for irradiating the reflected light on detection surface; a camera for detecting the light reflected upon said detection surface; and a means for comparing the image before and after the contact of the finger and for storing the image of fingerprint to a memory when the number of pixels with predetermined density differences is in the range of a predetermined number.

DETAILED DESCRIPTION OF THE PREFERRED EMBODIMENTS

Figure 1:
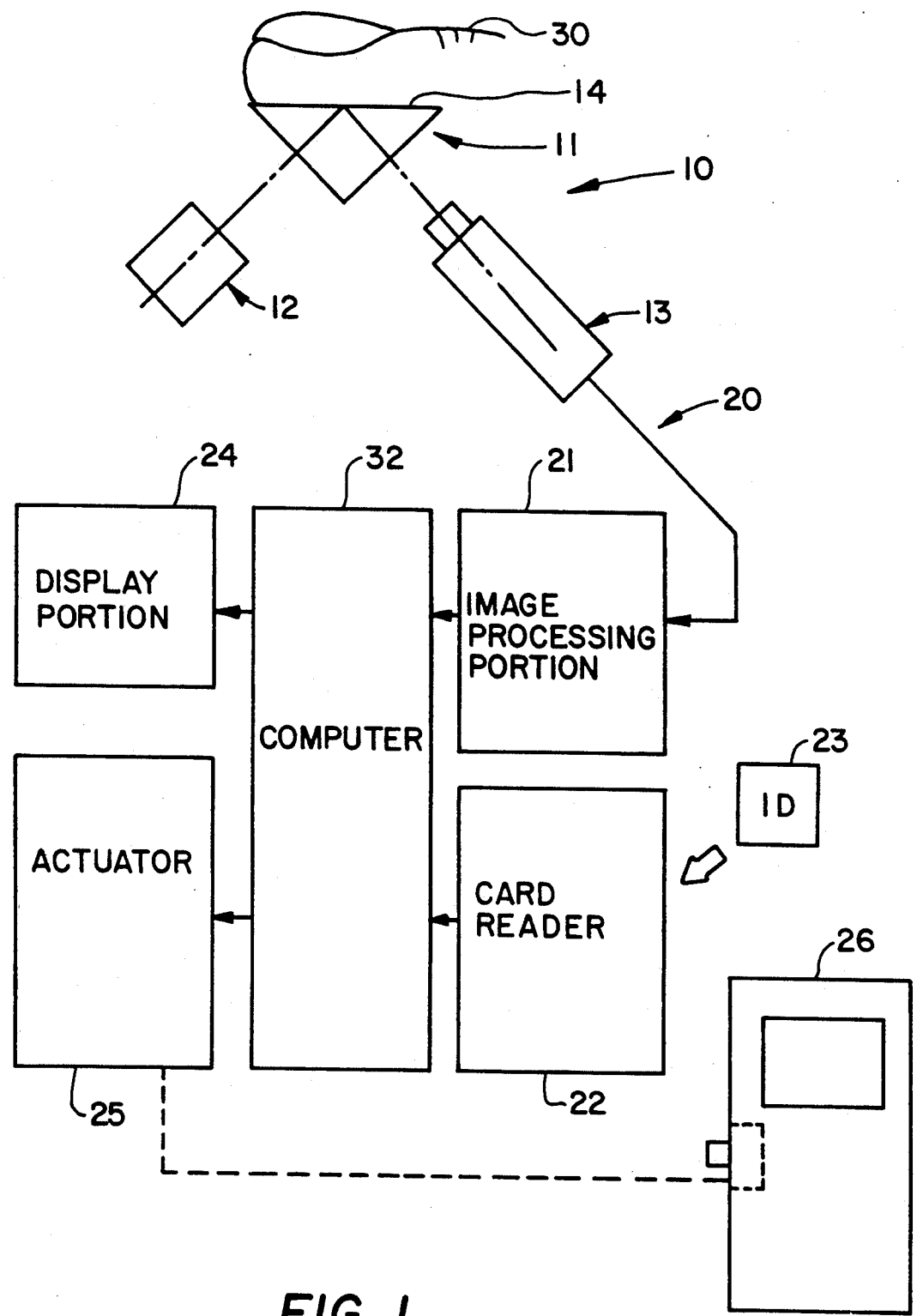
FIG. 1 shows a block diagram of a fingerprint photographing system of an embodiment according to the present invention.

FIG. 1 shows a fingerprint verification system of the fingerprint photographing system according to the preferred embodiment. The fingerprint verification system includes an image input system 10 and a verification processing system 20. Comparison processing is performed onto the image photographed by the image input system 10 at the verification processing system 20. At the image input system 10, the total reflection of the illumination incident upon the right-angle prism 11 from the luminous source 12 is detected by the CCD camera 13. A slanting surface 14 of the prism 11 is deemed to be the detection surface, where the finger 30 fingerprinted is pressed. When the finger FIN is not pressed to the detection surface, the entire illumination light is totally reflected and, the image detected by the CCD camera 13 is completely white.

The verification processing system 20 comprises an image processing portion 21 and a card reader 22. The master data is read when a person inserts an ID card 23 into the card reader 22, then the comparison of the data inputted from the image input system 10 and the master data is performed by the computer 32. The comparison results are displayed at display portion 24. When the comparison results reveal a match of fingerprints come up to the standard, an actuator 25 is operated and a door 26 is opened.

Various types of master data are adaptable, such as entering an ID number of the person examined with a keyboard.

Figure 2:
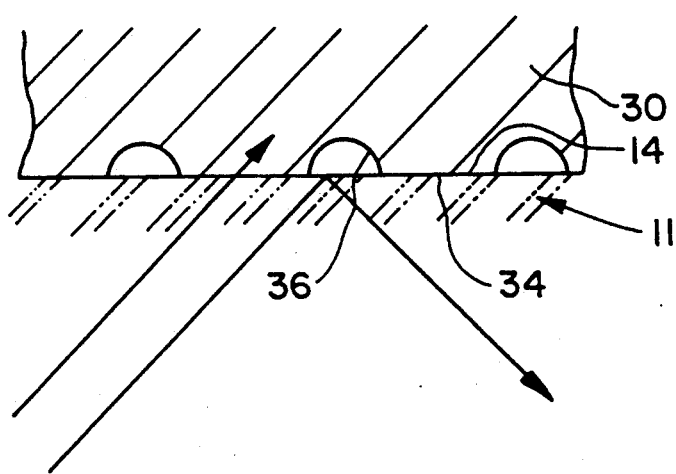
FIG. 2 shows a drawing of contact portions of a slanting surface of a right-angle prism.

FIG. 2 is a view of the contact portion of the slanting surface 14 of the right-angle prism 11 and the finger 30. A protruding portion 34 of the finger 30 contacts to the slanting surface 14, but the hollowed portions 36 do not contact to the slanting surface 14. The illumination form the luminous source 12 refracts at the slanting surface 14, then is inputted to the CCD camera 13. Here, the angle of refraction with respect to the slanting surface 14 changes depending upon the contacting condition of the finger 30. Accordingly, the illumination totally reflects at the hollowed portions 36, so that these portions are detected as the bright area by the CCD camera 13. On the other hand, the illumination at the protruding portion 34 do not totally refract and pass through the interface of the prism, since the angle of refraction on the interface of the prism changes. Therefore, the protruded portions of the fingerprint are inputted to the CCD camera 13 at the dark lines with gray levels.

Accordingly, the portions which do not contact to the slanting surface 14 of the prism 11 are detected by the CCD camera 13 in the same brightness irrespective of their distances to the slanting surface 14. The hollowed portion 36 appears as a constant brightness, therefore, a fingerprint image with very distinct dark lines are always obtainable.

As it is mentioned above, the image before contacting the finger 30 onto the prism 11 is all white, while the image after contacting the finger 30 onto the prism 11 had dark lines corresponding to the fingerprint. This image of the fingerprint changes depending upon the dampness of the surface of the finger 30 or the given pressure of the finger 30 to the detection surface of the prism 11. A clear image can be obtained when a finger with moderate dampness is contacted to the prism 11 with an appropriate level of pressure.

According to the preferred embodiment, the determination of the clearness of the image to be accepted is described below.

The density of each pixel of an image data at the predetermined area of the image data input from the image processing portion 21 is determined by the computer 32. The density is expressed with 256 gray levels. When 30000 35000 of pixels have a density difference before and after the contact of the finger of 15 or more gray levels is, the image data is considered to have an image clear enough to be stored in the memory of the computer 32 for the fingerprint verification. That is, when the area touched by a finger exceeds the above predetermined value, useful data can be obtained by photographing the finger. The blurring of an image can be prevented by giving an instruction to wait before reading data. Such an instruction can be executed by using a voice synthesizing system, for example. The blurred image data are ignored by the computer 32, and are not used for the fingerprint verification.

The above numerical values are just an example. It is possible to change the value according to the objective operations.

Furthermore, the luminous source 12 does not have to be the special structure. An ordinary incandescent lamp will do. The CCD camera 13 can be replaced by another appropriate camera depending on its object.

As mentioned above, the fingerprint photographing system to the present invention is obtainable of the clear image data of the fingerprint. This may simplify such processing as fingerprint verification.

What is claimed is:

1. A fingerprint photographing system comprising:
   a prism having a detection surface, said detection surface detecting a finger pressed thereon;
   a luminous source irradiating light to said detection surface;
   a camera detecting light from said luminous source which is reflected off of said detection surface; and
   means for comparing an image of said finger pressed upon said detection surface to other fingerprints and for storing said image of said finger when a number of pixels of said image having a predetermined density difference before and after said finger is pressed upon said detection surface is within a predetermined range of numbers.

2. The fingerprint photographing system claimed in claim 1, further comprising a card reader for receiving data which identifies a master data file of said other fingerprints to be compared with said image of said finger in said comparing means.

3. The fingerprint photographing system claimed in claim 1, further comprising an actuator for opening a door.

4. The fingerprint photographing system claimed in claim 1, further comprising a keyboard for manually inputting identification numbers to identify said other fingerprints to be compared with said image of said finger in said comparing means.

5. The fingerprint photographing system claimed in claim 1, wherein said predetermined density difference is 16 levels and said predetermined range of pixel numbers is between 30000 and 35000.

* * * * *